United States Patent [19]

Kress et al.

[11] Patent Number: 4,618,307

[45] Date of Patent: Oct. 21, 1986

[54] SCRAP BUCKET CARRIER

[75] Inventors: Edward S. Kress; William L. LaBerdia; Dennis R. Thomas, all of Brimfield, Ill.

[73] Assignee: Kress Corporation, Brimfield, Ill.

[21] Appl. No.: 704,382

[22] Filed: Feb. 22, 1985

[51] Int. Cl.$^4$ .............................................. B60P 1/64
[52] U.S. Cl. ................................... 414/498; 414/481; 414/495; 180/139; 280/423 B; 280/414.5; 280/43.23
[58] Field of Search ............... 414/498, 495, 474, 475, 414/476, 481, 483, 484, 496, 497, 499, 500, 458, 589, 917; 180/139; 280/423 B, 414.5, 43.23, 43.17; 254/2 R, 2 B, 2 C, 8 R, 8 B, 8 C, 10 R, 10 B, 10 C

[56] References Cited

U.S. PATENT DOCUMENTS

| | | | |
|---|---|---|---|
| 2,925,930 | 2/1960 | Parks | 414/498 |
| 3,285,448 | 11/1966 | Palm, Sr. et al. | 414/495 |
| 3,434,606 | 3/1969 | Asamura | 414/495 X |
| 3,442,409 | 5/1969 | Larson | 414/495 |
| 3,451,572 | 6/1969 | Rossoni | 414/498 |
| 3,459,312 | 8/1969 | Britcher, Jr. et al. | 414/495 X |
| 3,517,944 | 6/1970 | Hage | 414/495 X |
| 3,520,433 | 7/1970 | Blackburn | 414/498 |
| 3,752,345 | 8/1973 | Molis | 414/498 |
| 3,764,166 | 10/1973 | Fiala | 414/481 X |
| 3,828,882 | 8/1974 | Biskup | 180/139 |
| 4,053,072 | 10/1977 | Ross et al. | 414/498 X |

Primary Examiner—Frank E. Werner
Attorney, Agent, or Firm—Leydig, Voit & Mayer, Ltd.

[57] ABSTRACT

A carrier for lifting and transporting a scrap bucket supported in a stand having a substantially rectangular lower frame with depending ground engaging legs is provided including a self-propelled tractor and a wheeled trailer having a main frame cross member dimensioned to fit between the stand legs and an integral forwardly projecting tongue with a gooseneck pivotally connected to the tractor to permit turning thereof at substantially right angles, a rear frame member secured to the main frame by a plurality of vertical plates, the trailer wheels being journalled on a plurality of trailing arms each pivotally connected at one end to the main frame and interconnected at the other end to the rear frame by a first hydraulic actuator and links and a second hydraulic actuator interconnecting the gooseneck to the tractor for raising and lowering the trailer tongue to maintain the trailer substantially level as the first and second hydraulic actuators are extended and retracted and the trailer and stand being provided with cooperating guide elements for centering the stand and bucket on the trailer.

2 Claims, 4 Drawing Figures

SCRAP BUCKET CARRIER

FIELD OF THE INVENTION

The present invention relates generally to heavy duty carriers and more particularly concerns a carrier for lifting and transporting a large metal scrap bucket and its associated supporting stand.

BACKGROUND OF THE INVENTION

In many heavy industries and foundry operations it is common to employ large metal scrap buckets to receive and temporarily store scrap metal for later reprocessing. Such scrap metal buckets may have a capacity of several hundred metric tons and are frequently provided with heavy duty bail like handles to facilitate lifting the buckets with a large mobile crane or the like. Some buckets of this type are provided with openable bottoms such as clam-shell closures to facilitate discharging the bucket contents into suitable receptacles. Desirably, such buckets are also supported by rigid frameworks or stands which hold the buckets above the ground or plant floor so as to prevent damage to the bucket bottom and closure mechanisms.

OBJECTS AND SUMMARY OF THE INVENTION

The primary aim of the present invention is to provide a heavy duty carrier for lifting and transporting a large scrap metal bucket or the like and its associated supporting stand from place to place within a foundry or other large processing plant. It is also an object to provide a rubber tired, heavy-duty carrier having a self-propelled tractor and a low slung trailer with a vertically movable support bed that may be backed by the tractor beneath a bucket supporting stand and then elevated to lift the heavy bucket and stand for ground transport purposes.

A more specific object of the invention is to provide such a heavy duty carrier with means for raising and lowering the trailer bed in a substantially horizontal manner so as to maintain the bucket and associated stand generally level during lifting and transport. Another object is to provide a trailer of the foregoing type with guide elements to facilitate positioning the trailer under the stand in a properly centered and balanced location.

To this end, according to the present invention, a carrier for lifting and transporting a scrap bucket or the like supported in a stand having a substantially rectangular lower frame with depending ground engaging legs is provided including a self-propelled tractor and a wheeled trailer having a main cross member dimensioned to fit between the stand legs and an integral forwardly projecting tongue with a gooseneck pivotally connected to the tractor to permit turning the carrier at substantially right angles. The trailer includes a rear frame member with a plurality of lift plates disposed to engage the rear frame of the stand and adapted to be raised and lowered with respect to the trailer wheels journalled on a plurality of trailing arms each pivotally connected at one end to the main frame and interconnected at the other end to the rear frame by a first hydraulic actuator and means including links and a second hydraulic actuator interconnecting the gooseneck to the tractor for raising and lowering the trailer tongue to maintain the trailer substantially level as the first and second hydraulic actuators are extended and retracted to raise and lower the trailer. Preferably, the outboard ones of the lift plates are formed with outside edges extending rearwardly and inwardly with respect to the trailer centerline to help guide the trailer between the stand legs and the trailing ends of the lift plates are angled downwardly to help guide the trailer under the rectangular frame of the stand.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
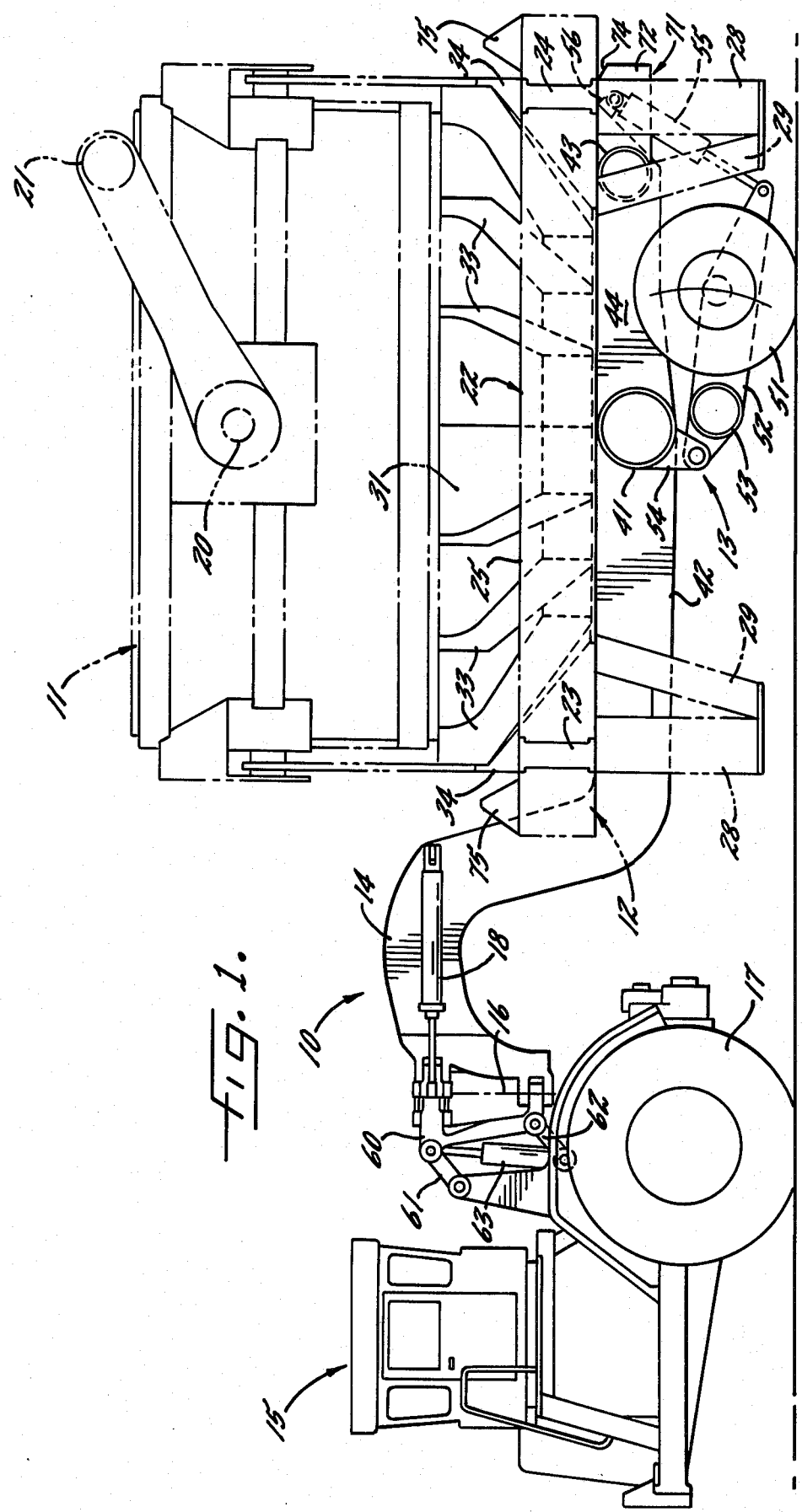
FIG. 1 is a side elevation of the heavy duty carrier of the present invention supporting a large metal scrap bucket and associated stand in transport position.
Figure 2:
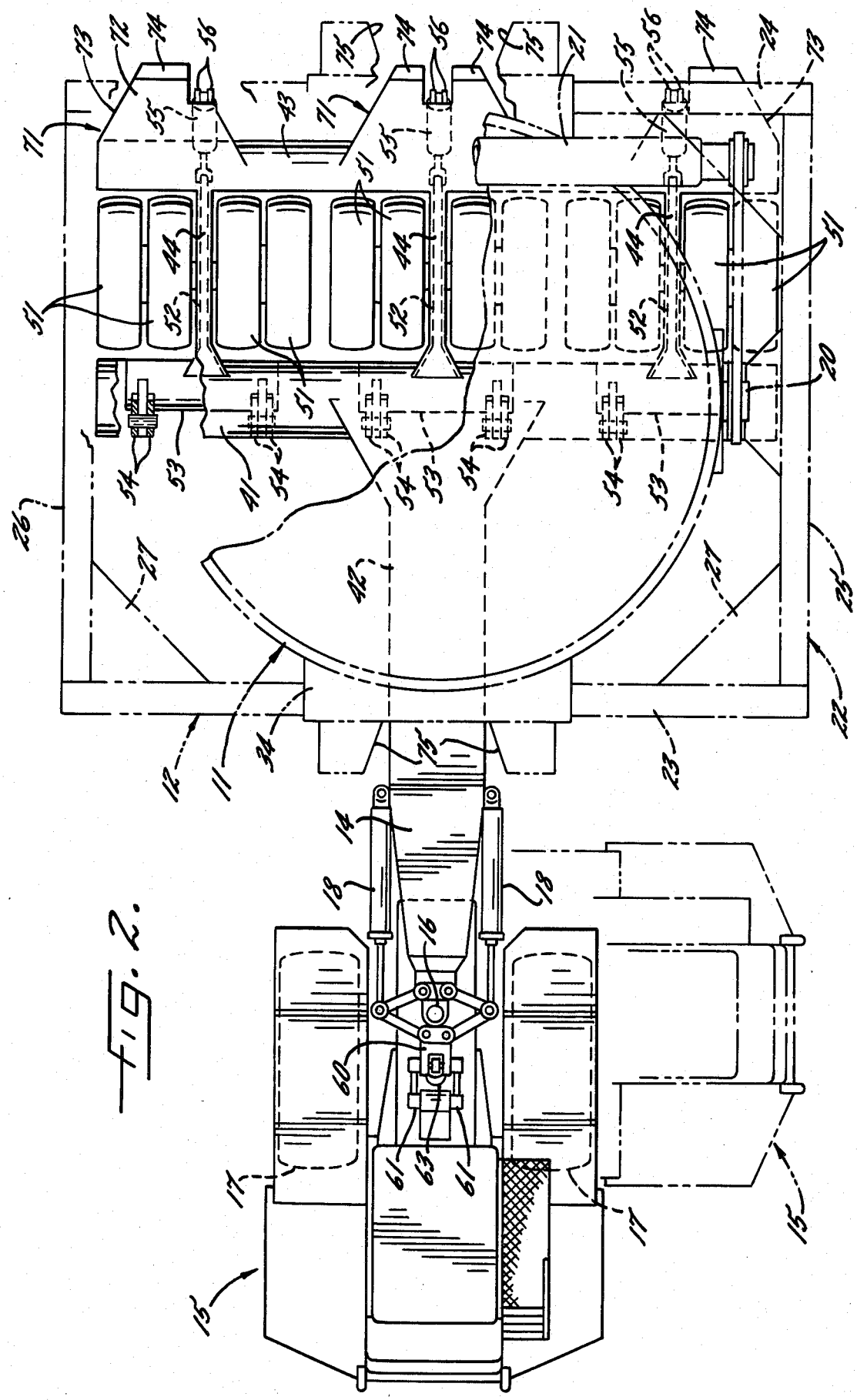
FIG. 2 is a top plan view of the carrier of FIG. 1 with the tractor shown for straight line movement in solid lines and for an extreme left turn in broken lines and with portions of the bucket and stand broken away to better see the trailer frame and wheels.
Figure 3:
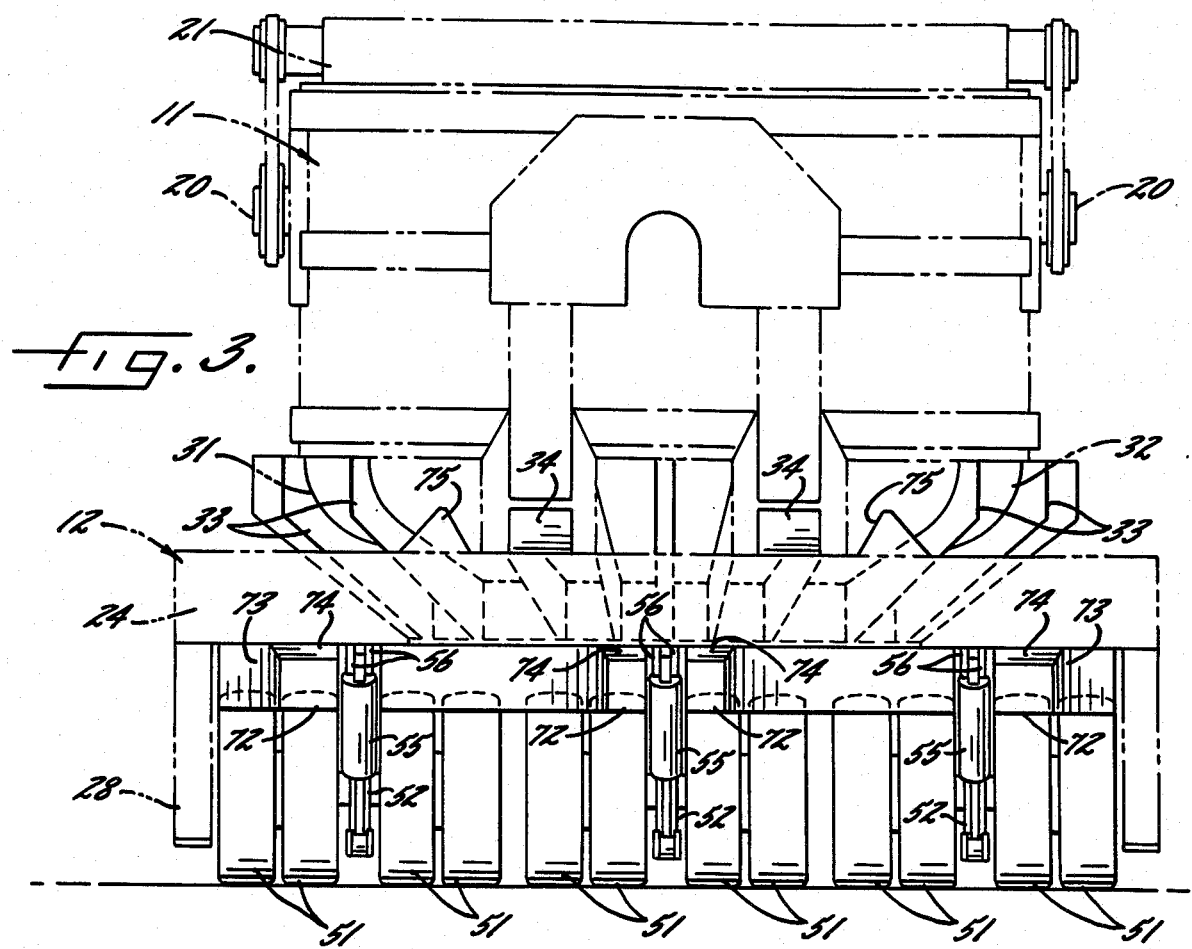
FIG. 3 is a rear elevation of the trailer, stand and bucket shown in FIGS. 1 and 2.

Turning now to the drawings, there is shown in FIG. 1 a carrier 10 for a scrap bucket or the like 11 supported in a stand 12. The carrier 10 includes a trailer 13 with a gooseneck-like member 14 connected to a suitable prime mover such as a two-wheeled tractor 15. The trailer 13 and tractor 15 are pivoted about a vertical axis 16 that passes close to the axis of tractor ground wheels 17. A pair of steering actuators 18 interconnect the tractor 15 and trailer 13 for pivoting the assembly about the vertical axis 16 to give extremely good maneuverability. The gooseneck-like member 14 provides sufficient clearance so that the tractor 15 can be turned substantially at right angles to the trailer 13 (see FIG. 2) and the carrier 10 can turn substantially within its own length.

The scrap bucket 11 typically is formed with side projections 20 in the form of trunnions on which a large bail-like handle 21 is pivotally mounted for lifting the bucket with a mobile crane or the like. The stand 12 is formed with a generally rectangular frame 22 comprised of end beams 23, 24 interconnected by side beams 25, 26 and reinforced at the corners by diagonal corner plates 27. Rigid legs 28 depend from the four corners of the frame 22 and are reinforced by diagonal braces 29 secured to the side beams 25, 26.

In the illustrated embodiment, the bucket 11 has an openable bottom formed of two clam shell closures 31 and 32 shown here in closed position. Each clam shell closure 31, 32 is reinforced on its outside by a plurality of generally radially extending ribs 33. As will be understood by those skilled in the art, the clam shell closures 31, 32 may be tripped to open when the bucket 11 is elevated in order to discharge the bucket contents into a suitable storage or processing receptacle or the like. The bucket 11 is both centered and supported in the stand 12 at the clam shell pivot arms 34 in nested relation with respect to the front and rear frame members 23, 24. Preferably, the stand 12 supports the bucket 11 such that the lowermost portion of the bucket is located above the lower surface of the frame beams 23-26 and thus the bucket closure elements 31, 32 are protected from engagement with the trailer 13 during transport.

The trailer 13 includes a centrally located tubular cross member 41 rigidly secured to a heavy duty forwardly projecting tongue 42 integral with the gooseneck 14. A rear tubular cross member 43 is rigidly secured to the center cross member 41 by a plurality of heavy, vertically disposed, longitudinally extending plates 44. (See FIG. 2.) The length of the center and rear cross members 41, 43 is such as to fit between the legs 28 of the support stand 12.

In accordance with the invention, the trailer 13 may be raised and lowered with respect to its support wheels 51 in order to pick up, transport and set down the scrap bucket 11 and its associated stand 12. To this end, the wheels 51 are journalled in side by side dual sets on trailing beams 52 each secured to a tubular sub-frame element 53 pivoted adjacent the ends thereof to the main cross member 41 on depending ears 54. Hydraulic actuators 55 interconnect the trailing ends of the beams 52 and brackets 56 on the underside of the rear member 43 to permit the trailer 13 to be raised and lowered (compare FIGS. 1 and 4).

Figure 4:
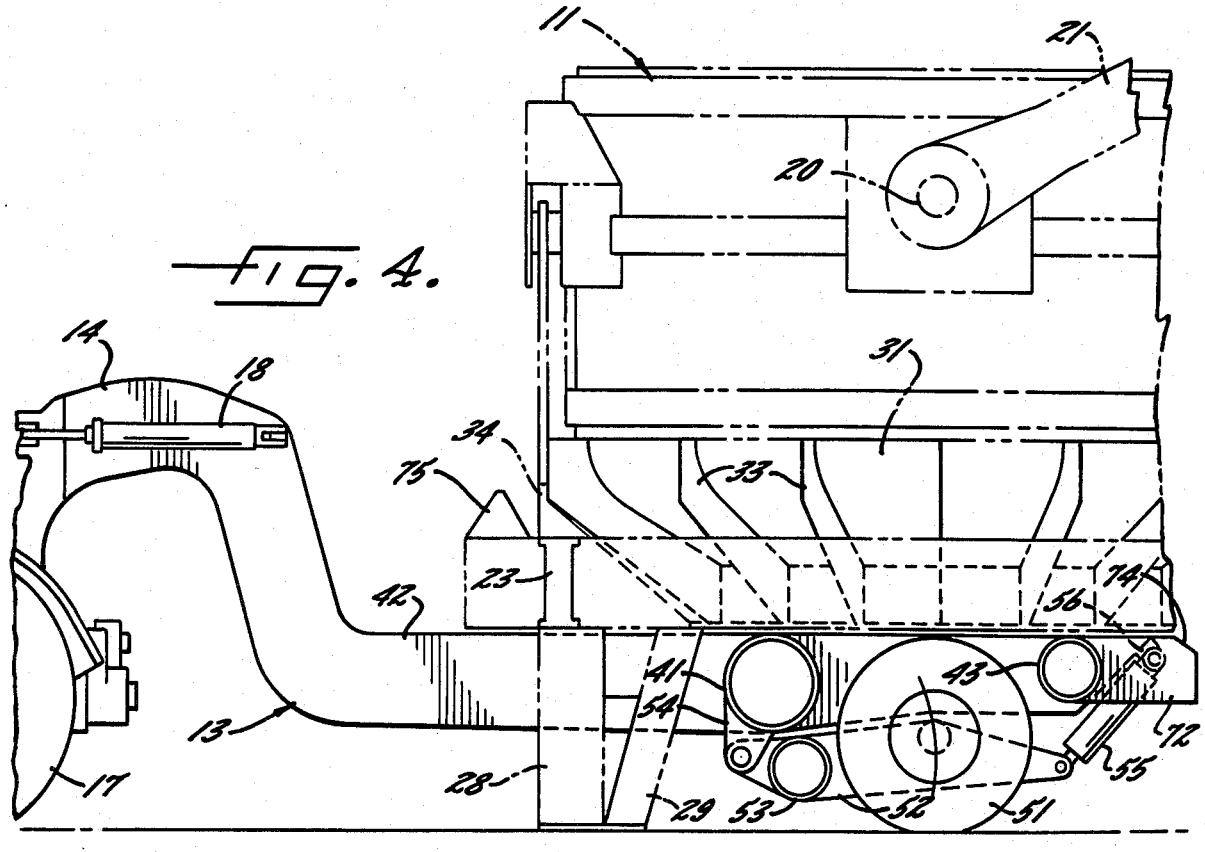
FIG. 4 is a fragmentary side elevation of the trailer in its lowered position with the stand legs resting on the ground.

To keep the trailer 13 and its forwardly projecting tongue 14 substantially level and parallel with the underside of frame 22, means are provided for also raising and lowering the gooseneck 14 with respect to the tractor 15. As shown in FIG. 1, the gooseneck 14 is pivoted to the tractor 15 through a yoke 60 supported by parallelogram links 61, 62 and a hydraulic actuator 63. It will be understood that retraction of the actuator 63 allows the links 61, 62 to pivot clockwise and lowers the yoke 60 and trailer gooseneck 14 from the position shown in FIG. 1 and allows the trailer 13 to be positioned under the stand 12 as shown in FIG. 4.

Pursuant to another aspect of the invention, means are provided for guiding the trailer 13 into the stand 12 and for distributing the weight of the bucket 11 and stand 12 substantially uniformly on the trailer. Thus, the upper surfaces of the tongue 42, center cross member 41, rear cross member 43 and support plates 33 are all disposed in substantially the same horizontal plane. Additionally, a plurality of flat lift plates 71 project substantially tangentially rearward from the top of the rear member 43 to support the rear end beam 24 of the frame 22. Preferably, each of the lift plates is rigidly secured to the rear cross member 43 by a reinforcing box section 72.

To help guide the trailer 13 between the legs 28 of the stand 12, the outer edges 73 of the two outboard lift plates 71 and their supporting box sections 72 are angled rearwardly and inwardly toward the centerline of the trailer. Also the trailing ends 74 of the lift plates 71 are angled downwardly to help guide the trailer 13 under the end beams 23, 24 of the stand 12.

In order to center the stand 12 and bucket 11 on the trailer 13, the stand 12 is provided with guide means 75 adjacent the front and rear beams 23, 24 adapted to cooperate with portions of the trailer tongue 42 and integral gooseneck 14. Preferably the guide means 75 are symmetrical on both the front and rear beams 23, 24 so that the trailer may be backed under and centered beneath the stand from either direction.

From the foregoing, it will be seen that a relatively simple heavy duty carrier is provided for lifting and transporting a heavy scrap metal bucket and its associated supporting stand. Provision is made for guiding and centering the carrier trailer beneath the stand and for maintaining the bucket and stand substantially level during lifting and transport. The integral tongue and gooseneck of the trailer permits the carrier to be turned substantially in its own length and the carrier is accordingly very maneuverable.

We claim as our invention:

1. A carrier for lifting and transporting a scrap bucket supported in a stand having a substantially rectangular lower frame with front, rear and side beams and depending ground engaging legs located substantially at the four corners thereof, comprising in combination, a self-propelled tractor and a wheeled trailer having a main frame cross member dimensioned to fit between the stand legs and an integral forwardly projecting tongue with a gooseneck pivotally connected to the tractor to permit turning thereof at substantially right angles, a rear frame member secured to the main frame member by a plurality of vertical plates, means for journalling the trailer wheels on a plurality of trailing arms each pivotally connected at one end to the main frame member and interconnected at the other end to the rear frame member by a first hydraulic actuator for raising and lowering the trailer, stand and bucket to transport position, and means including links and a second hydraulic actuator interconnecting the gooseneck to the tractor for raising and lowering the trailer tongue to maintain the trailer substantially level as the first and second hydraulic actuators are simultaneously extended and retracted, a plurality of lift plates projecting substantially tangentially rearwardly and horizontally from the rear frame member so as to underlie and support the rear beam of the stand, said lift plates being secured to the rear frame member by rigid box sections and being disposed in substantially the same horizontal plane as the top surfaces of said main frame cross member and integrally connected tongue, the outboard ones of said lift plates being formed with outside edges extending rearwardly and inwardly with respect to the trailer centerline to help guide the trailer between the stand legs, the trailing ends of said lift plates and supporting box sections being angled downwardly to help guide the trailer under the rectangular frame of the stand, and the stand being provided with guide means projecting forwardly from its front beam to cooperate with the trailer gooseneck to center the stand laterally on the trailer.

2. A carrier as defined in claim 1 wherein the stand is provided with guide means projecting respectively forwardly and rearwardly from its front and rear beams, at least one of said guide means at a time being adapted to cooperate with portions of the trailer gooseneck to center the stand laterally one the trailer as it is backed under the frame of the stand from either the front or rear side thereof.

* * * * *